United States Patent
Kahn

(10) Patent No.: US 12,378,420 B2
(45) Date of Patent: Aug. 5, 2025

(54) PROCESS FOR MAKING A POWDER FOR BONDING TO A SUBSTRATE

(71) Applicant: AXALTA COATING SYSTEMS IP CO., LLC, Wilmington, DE (US)

(72) Inventor: Safraz Kahn, London (GB)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 1054 days.

(21) Appl. No.: 17/105,228

(22) Filed: Nov. 25, 2020

(65) Prior Publication Data

US 2022/0162455 A1 May 26, 2022

(51) Int. Cl.
| | | |
|---|---|---|
| C09D 5/00 | (2006.01) | |
| C08K 3/22 | (2006.01) | |
| C09D 5/03 | (2006.01) | |
| C09D 5/10 | (2006.01) | |
| C09D 123/08 | (2006.01) | |
| C09D 133/10 | (2006.01) | |
| C09D 135/08 | (2006.01) | |

(52) U.S. Cl.
CPC ............... *C09D 5/031* (2013.01); *C08K 3/22* (2013.01); *C09D 5/106* (2013.01); *C09D 123/0869* (2013.01); *C09D 133/10* (2013.01); *C09D 135/08* (2013.01); *C08K 2003/2296* (2013.01)

(58) Field of Classification Search
None
See application file for complete search history.

(56) References Cited

U.S. PATENT DOCUMENTS

| | | | |
|---|---|---|---|
| 6,562,906 B2 | 5/2003 | Chen | |
| 6,653,382 B1 | 11/2003 | Statz et al. | |
| 6,777,472 B1 | 8/2004 | Statz et al. | |
| 7,144,938 B1 | 12/2006 | Feinberg et al. | |
| 7,994,275 B1* | 8/2011 | Bolton | B29C 48/762 525/85 |
| 2003/0065103 A1* | 4/2003 | Chou | C09D 123/0876 525/367 |
| 2011/0028638 A1* | 2/2011 | Kelly | C09D 5/03 524/543 |
| 2012/0283039 A1 | 11/2012 | Chen | |
| 2015/0174453 A1 | 6/2015 | Bishop et al. | |
| 2017/0306134 A1 | 10/2017 | Hattori et al. | |

FOREIGN PATENT DOCUMENTS

| | | |
|---|---|---|
| CN | 1711027 A | 12/2005 |
| CN | 102203143 A | 9/2011 |
| EP | 102797 A1 | 5/2001 |
| EP | 1124898 B1 | 12/2004 |
| EP | 2154207 A1 | 2/2010 |
| EP | 2087014 B1 | 5/2010 |
| EP | 1222226 B1 | 7/2010 |
| EP | 2798009 A1 | 11/2014 |
| EP | 3208285 A1 | 8/2017 |
| WO | 0006619 A1 | 2/2000 |
| WO | 2013101886 A1 | 7/2013 |

\* cited by examiner

*Primary Examiner* — Mandy C Louie
(74) *Attorney, Agent, or Firm* — Ingrassia Fisher & Lorenz, LLP

(57) ABSTRACT

A process includes combining a copolymer and mono- or di-valent metal ions to form a mixture, wherein the copolymer has from about 70 to about 98 wt % of an alpha-olefin moiety and about 2 to about 30 wt % of a (meth)acrylate moiety; reactively extruding the mixture to form a neutralized copolymer having a melt flow index of from about 5 to about 1500 g/10 min, wherein about 2 to about 50 wt % of the (meth)acrylate moiety is neutralized to form a mono- or di-valent metal salt present in an amount of from about 0.2 to about 20% based on the total (meth)acrylic acid content of the copolymer; and grinding the neutralized copolymer to form the powder having a Dv50 particle size of from about 10 to about 600 μm as determined using ASTM D5861, wherein the process is free of utilizing a liquid and/or a slurry.

20 Claims, No Drawings

PROCESS FOR MAKING A POWDER FOR BONDING TO A SUBSTRATE

TECHNICAL FIELD

The present disclosure generally relates to a process for making a power for bonding to a substrate. More particularly, the disclosure relates to a process that includes reactive extrusion but is free of using a liquid and/or a slurry.

BACKGROUND

Thermoplastic coatings are widely used in applications with metal and glass where a high level of durability is required. Products formed from thermoplastic powder coatings also need combined corrosion and abrasion resistance under tough operating and climate conditions. Superior impact resistance, chemical protection, electrical insulation, and a high-quality decorative finish are also requirements of some products.

Ionomers are thermoplastic, well known in the art, and currently used in a variety of applications. Ionomers have shown great advantages due to their scratch and abrasion resistance, as well as toughness. Applications include automotive applications and sports applications, for example in golf balls and shoe soles such as cleated soles. Ionomers can also be formed into films for a variety of packaging applications. Ionomers are also used for powder coating metals due to their functional or decorative performance. Commercially available ionomers include copolymers of ethylene and acrylic acid or methacrylic acid found in the IOTEK (Exxon Mobile Chemical Company) and SURLYN (Dupont Company) product lines.

The downside of using currently commercially available ionomers in industrial processes is that their supply cannot be guaranteed especially if the required volumes required are low. In addition, currently commercially available ionomers are not processed using standard extrusion process or conventional extrusion equipment. The process relies on reactive extrusion, an aqueous solution of metallic ions, and at least 4 zones. A first zone allows for the addition and melting of a polymer containing acid functionality. A second zone allows for the addition of the aqueous solution of metallic ions. A third zone allows for mixing and reaction of the aqueous solution of metallic ions with carboxyl functionality of the polymer. Finally, a fourth zone allows for the discharge of the ionomer and water vapor. The process relies on keeping the pressure relatively high in the third zone to allow sufficient residence time for complete reaction and preventing water vapor from escaping. The problems associated with such processes are that not all commercial extruders are designed to handle aqueous solutions or slurries of metal cations. Large scale ionomer preparation and subsequent extraction of volatiles generated from the use of aqueous solutions and slurries is challenging. Downtime between runs and other production requirements make sure a processes not commercially advantageous.

Accordingly, there remains opportunity for improvement. Furthermore, other desirable features and characteristics of the present disclosure will become apparent from the subsequent detailed description of the disclosure and the appended claims, taken in conjunction with the background of the disclosure.

BRIEF SUMMARY

This disclosure provides a process for making a powder for bonding to a substrate. The process includes combining a copolymer and mono- or di-valent metal ions to form a mixture, wherein the copolymer has from about 70 to about 98 wt % of an alpha-olefin moiety and about 2 to about 30 wt % of a (meth)acrylate moiety, each based on a total weight of the copolymer; reactively extruding the mixture to form a neutralized copolymer having a melt flow index of from about 5 to about 1500 g/10 min, wherein about 2 to about 50 wt % of the (meth)acrylate moiety is neutralized to form a mono- or di-valent metal salt present in an amount of from about 0.2 to about 20% based on the total (meth)acrylic acid content of the copolymer; and grinding the neutralized copolymer to form the powder such that a temperature of grinding does not exceed a melting point of the neutralized copolymer, wherein the powder has a Dv50 particle size of from about 10 to about 600 μm as determined using ASTM D5861, wherein the process is free of utilizing a liquid and/or a slurry.

This disclosure also provides a process that includes combining a copolymer and mono- or di-valent metal ions to form a mixture, wherein the copolymer has from about 80 to about 98 wt % of an ethylene moiety and about 2 to about 20 wt % of a (meth)acrylate moiety; reactively extruding the mixture to form a neutralized copolymer having a melt flow index of from about 10 to about 35 g/10 min, wherein about 2 to about 20 wt % of the (meth)acrylate moiety is neutralized to form a mono- or di-valent metal salt comprising about 4 to about 12 wt % zinc oxide based on total (meth)acrylic acid content; and cryogenically grinding the neutralized copolymer to form the powder having a Dv10 particle size of from about 40 to about 80 μm, a Dv50 particle size of from about 100 to about 200 μm, and a Dv90 particle size of from about 150 to about 300 μm, each as determined using ASTM D5861, wherein the process is free of utilizing a liquid and/or a slurry.

DETAILED DESCRIPTION

The following detailed description is merely exemplary in nature and is not intended to limit the instant method or powder. Furthermore, there is no intention to be bound by any theory presented in the preceding background or the following detailed description.

Embodiments of the present disclosure are generally directed to methods of forming powders. For the sake of brevity, conventional techniques related to reactive extrusion and powder formation may not be described in detail herein. Moreover, the various tasks and process steps described herein may be incorporated into a more comprehensive procedure or process having additional steps or functionality not described in detail herein. In particular, various steps in the manufacture of neutralized copolymers are well-known and so, in the interest of brevity, many conventional steps will only be mentioned briefly herein or will be omitted entirely without providing the well-known process details.

This disclosure provides a process for making a powder, e.g. for bonding to a substrate such as a metal substrate. The process is free of utilizing a liquid and/or a slurry of any one or more components described below. The terminology "liquid" does not include a molten state of one or more components in an extruder. Instead, "liquid" describes a solution of one or more components described below such as an aqueous solution. This process may be described as a dry process.

The powder is not particularly limited except as described below relative to chemistry and general particle size. In various embodiments, the powder includes or is a series of particles. The particles may have a Dv10, Dv50, Dv90, Dn10, Dn50, and/or Dn90 particle size each independently as described below, e.g. each independently of from about 10 to about 600, about 10 to about 575, about 10 to about 550, about 10 to about 525, about 10 to about 500, about 20 to about 490, about 30 to about 480, about 40 to about 470, about 50 to about 460, about 60 to about 450, about 70 to about 440, about 80 to about 430, about 90 to about 420, about 100 to about 410, about 110 to about 400, about 120 to about 390, about 130 to about 380, about 140 to about 370, about 150 to about 360, about 160 to about 350, about 170 to about 340, about 180 to about 330, about 190 to about 320, about 200 to about 310, about 210 to about 300, about 220 to about 290, about 230 to about 280, about 240 to about 270, or about 250 to about 260, μm as determined using one or more methods such as ASTM D5861, ISO 13320:2009, ISO 13320:2020, or the like. In various embodiments, the Dv10 is from about 40 to about 80, about 45 to about 75, about 50 to about 70, about 55 to about 65, or about 55 to about 60, μm as determined using one or more methods such as ASTM D5861, ISO 13320:2009, ISO 13320:2020, or the like. In other embodiments, the Dv50 is about 100 to about 200, about 110 to about 190, about 120 to about 180, about 130 to about 170, about 140 to about 160, or about 150 to about 160, μm as determined using one or more methods such as ASTM D5861, ISO 13320:2009, ISO 13320:2020, or the like. In other embodiments, the Dv90 is about 150 to about 300, about 160 to about 290, about 170 to about 280, about 180 to about 270, about 190 to about 260, about 200 to about 250, about 210 to about 240, or about 220 to about 230, μm as determined using one or more methods such as ASTM D5861, ISO 13320:2009, ISO 13320:2020, or the like. In other embodiments, the powder may have a Dv10 particle size of from about 60 to about 80 μm, a Dv50 particle size of from about 180 to about 200 μm, and a Dv90 particle size of from about 280 to about 300 μm, as determined using one or more methods such as ASTM D5861, ISO 13320:2009, ISO 13320:2020, or the like. Alternatively, the power may have a Dv10 particle size of from about 40 to about 50 μm, a Dv50 particle size of from about 115 to about 125 μm, and a Dv90 particle size of from about 160 to about 180 μm, as determined using one or more methods such as ASTM D5861, ISO 13320:2009, ISO 13320:2020, or the like. It is also contemplated that one or more of the Dv10, Dv50, Dv90, Dn10, Dn50, and/or Dn90 particle size measurements may fall outside of the aforementioned ranges. Alternatively, a Dv10, Dv50, Dv90, Dn10, Dn50, and/or Dn90 particle size may be any described above. Moreover, the particle size may be determined using any apparatus known in the art, e.g. a Malvern Mastersizer such as the Mastersizer 3000. Relative to software version, type of light scattering model applied, real and imaginary part of complex refractory index if Mie theory is applied, refractive index, sampling procedure, amount and power of ultrasound, etc. can each be chosen by one of skill in the art if not set forth in the aforementioned standard procedures. The powder also typically includes a weight percent of water (e.g. as absorbed from the atmosphere of less than about 10, 9, 8, 7, 6, 5, 4, 3, 2, 1, 0.5, or 0.1, weight percent based on a total weight of the powder. In various non-limiting embodiments, all values and ranges of values, both whole and fractional, both between and including each of the above, are hereby expressly contemplated for use herein.

It is contemplated that the powder may be used for bonding to a substrate, e.g. a metal substrate. However, the substrate is not limited to metal. The substrate may be metal, wood, glass, plastic, rock, brick, concrete, silicone, polymeric, etc. Moreover, the bond may be physical, chemical, or a combination of physical and chemical bonding.

The method includes the step of combining a copolymer and mono- or di-valent metal ions to form a mixture. The co-polymer may be described as a traditional copolymer or may be alternatively described as a ter-polymer, if more than two monomers are reacted. As used herein, the term "copolymer" means a polymer that contains two or more different monomers. As used herein, the term "terpolymer" means a copolymer that comprises three or more distinct monomers. As used herein, use of the term "copolymer," without specific reference to "terpolymer," is understood to encompass both copolymers and terpolymers. Where the terms "polymer" or "polymers" are used to refer to compositions, it is understood that these terms can also refer to copolymers and/or terpolymers.

In various embodiments, the copolymer has from about 70 to about 98 wt % of an alpha-olefin moiety and about 2 to about 30 wt % of a (meth)acrylate moiety, each based on a total weight of the copolymer. For example, the copolymer may have from about 75 to about 90, about 75 to about 85, about 75 to about 80, about 80 to about 95, about 80 to about 90, about 80 to about 85, about 80 to about 90, about 85 to about 95, about 85 to about 90, or about 90 to about 95, wt % of an alpha-olefin moiety based on a total weight of the copolymer. In other embodiments, the copolymer has 75, 76, 77, 78, 79, 80, 81, 82, 83, 84, 85, 86, 87, 88, 89, 90, 91, 92, 93, 94, or 95, wt % of an alpha-olefin moiety based on a total weight of the copolymer. In other embodiments, the copolymer has from about 2 to about 25, about 2 to about 20, about 2 to about 15, about 2 to about 10, about 2 to about 5, about 10 to about 25, about 15 to about 20, about 15 to about 30, about 20 to about 30, about 25 to about 30, about 15 to about 25, about 20 to about 30, about 20 to about 35, or about 25 to about 30, wt % of a (meth)acrylate moiety based on a total weight of the copolymer. In further embodiments, the copolymer has 2, 3, 4, 5, 6, 7, 8, 9, 10, 11, 12, 13, 14, 15, 16, 17, 18, 19, 20, 21, 22, 23, 24, 25, 26, 27, 28, 29, or 30, wt % of a (meth)acrylate moiety based on a total weight of the copolymer. In various non-limiting embodiments, all values and ranges of values, both whole and fractional, both between and including each of the above, are hereby expressly contemplated for use herein.

The alpha-olefin moiety is not particularly limited and may be any known in the art. In various embodiments, it is derived from ethylene, propene, 1-butene, 1-decene, isobutylene, or combinations thereof. In other embodiments, this moiety is derived from 1-butene, 1-hexene, 1-octene, 1-decene, 1-dodecene, 1-tetradecene, 1-hexadecene, 1-octadecene, or higher olefin blends of C20-C24, C24-C30, and C20-C30 compounds. It is also contemplated that this moiety can result from the reaction of one or more monomers chosen from acrylonitrile, ally alcohol, methallyl alcohol, carbon dioxide, propene, 1-butene, isobutylene, 1,3-butadiene, styrene, α-methylstyrene, vinyl chloride, acrylonitrile, maleic anhydride, N-vinyl-N-methylformamide, vinyl acetamide, N-vinyl formamide, N-(hydroxymethyl)-N-vinylformamide hydroxyethyl acrylate, methylvinyl ketone, diacetone acrylamide, sulfur dioxide, maleic acid diesters, maleic acid, maleic acid monoesters, itaconic acid, fumaric acid, fumaric acid monoester, salts of therefore, and combinations thereof. It is also contemplated that this moiety may be derived from a C3-C8 (e.g. C3, C4, C5, C6, C7, or C8) alpha-beta-ethylenically unsaturated carboxylic acid. In various non-limiting embodiments, all values and ranges of values, both between and including each of the above, are hereby expressly contemplated for use herein.

The terminology "(meth)acrylate" means that the "meth" group is optional and may or may not be present. In other words, "(meth)acrylate" could include methacrylate or simply acrylate. The "(meth)acrylate" moiety may be further defined as a methacrylate moiety or an acrylate moiety. In various embodiments, this moiety is, or is derived from, acrylate, methacrylate, glycidyl acrylate, glycidyl methacrylate, glycidyl vinyl ether, ethyl acrylate, isopropyl acrylate, butyl acrylate, pentyl acrylate, methyl methacrylate, ethyl methacrylate, propyl methacrylate and butyl methacrylate, pentylmethacrylate, and combinations thereof.

In various embodiments, the copolymer is the reaction product of an alpha-olefin, a (meth)acrylate, and an additional co-monomer, such that a co-monomer moiety is present in the copolymer in an amount of up to about 25 wt % based on a total weight of the copolymer. In various embodiments, the co-monomer moiety is present in an amount of 1, 2, 3, 4, 5, 6, 7, 8, 9, 10, 11, 12, 13, 14, 15, 16, 17, 18, 19, 20, 21, 22, 23, 24, or 25, wt %, or any range thereof. The co-monomer is not particularly limited and may be any C2-C20 olefin acetate, C2-C20 alkylacrylate, C2-C20 alkyl vinyl ether, etc. In various embodiments, the alpha-olefin is ethylene, the (meth)acrylate is methacrylate and/or acrylic acid, and the comonomer is chosen from vinyl acetate, a C1-C11 alkylacrylate, a C3-C11 alkyl vinyl ether, and combinations thereof. In other embodiments, the comonomer is chosen from vinyl acetate, a C1-C11 alkylacrylate, a C3-C11 alkyl vinyl ether, and combinations thereof. In still other embodiments, the alpha-olefin moiety is an ethylene moiety and the (meth)acrylate moiety is a methacrylate and/or acrylic acid moiety. In various non-limiting embodiments, all values and ranges of values, both whole and fractional, both between and including each of the above, are hereby expressly contemplated for use herein.

The method also includes the step of reactively extruding the mixture to form a neutralized copolymer (which can also be described as an ionomer). This step is not particularly limited and may include any reactive extrusions steps chosen by one of skill in the art. For example, the conditions may be as described in the examples with each parameter optionally varying by 1, 2, 3, 4, 5, 6, 7, 8, 9, 10, 15, 20, or 25%. Moreover, the extruder may include one, two, or more screws and may be fed by one, two, or more feeders. One or more than one zone may be utilized. Each zone may independently have a temperature of from about 100 to about 400° C. In various embodiments, the temperature is from about 175 to about 250, about 200 to about 225, or about 215 to about 225, ° C. The step of reactively extruding typically describes reacting the metal ions with the copolymer in the melt phase of the extrusion process. This is done without the need for aqueous solutions or slurries of metal ions. The neutralized copolymer can be formed either via one pass or multiple passes through the extruder depending on screw configuration, temperature, speed, residence time and barrel length. The neutralized copolymer can also be formed in situ without the need for any additional processing steps such as the need to pre-prepare the neutralized copolymer before final powder preparation. Additives can be added with inclusion of the metal ions without any additional processing steps. In various non-limiting embodiments, all values and ranges of values, both whole and fractional, both between and including each of the above, are hereby expressly contemplated for use herein.

The neutralized copolymer has a melt flow index of from about 5 to about 1500 g/10 min. In various embodiments, the melt flow index is from about 5 to about 600, about 15 to about 600, about 5 to about 35, about 10 to about 35, about 15 to about 30, about 15 to about 35, about 20 to about 25, about 25 to about 40, about 30 to about 35, about 30 to about 40, or about 35 to about 40, g/10 min. The melt flow index is used as an indication of the viscosity of the copolymer and its ability to flow to provide a smooth and even coated surface. If melt flow index is too low this could result in a textured or rough surface due to poor flow. However if the melt flow index is too high then this could result in sagging and dripping of the polymer during. The melt flow index may be determined using any method known in the art, e.g. using a Dynesco LMI-4000 MFI Tester and ASTM D1238-10 and ISO1133. In various non-limiting embodiments, all values and ranges of values, both whole and fractional, both between and including each of the above, are hereby expressly contemplated for use herein.

During extrusion, about 2 to about 50 wt % of the (meth)acrylate moiety is neutralized to form a mono- or di-valent metal salt. In various embodiments, this amount is from about 2 to about 45, about 2 to about 40, about 2 to about 35, about 2 to about 30, about 2 to about 25, about 2 to about 20, about 2 to about 15, about 2 to about 10, about 2 to about 5, about 5 to about 45, about 10 to about 40, about 15 to about 35, about 20 to about 30, or about 20 to about 25, or about (or up to about) 5, 10, 15, 20, 25, 30, 35, 40, 45, or 50, %. The mono- or di-valent metal salt is not particularly limited and may be a salt of any metal described herein. In various embodiments, the powder and/or the copolymer may include, or be free of, one or more of a metal phosphate, a metal sulfate, and/or a metal oxide, or combinations thereof. In other embodiments, the metal is chosen from sodium, potassium, lithium, magnesium, barium, calcium, zinc, and zirconium, or combinations thereof. In various embodiments, the powder and/or the copolymer may include, or be free of, any one of the aforementioned metal phosphates, metal sulfates, and/or metal oxides. For example, in various embodiments, the powder and/or the copolymer may include, or be free of, zinc phosphate, zinc sulfate, zinc oxide, or combinations thereof. In one embodiment, the copolymer includes zinc oxide. In various embodiments, about 4 to about 12, about 5 to about 11, about 6 to about 10, about 7 to about 9, or about 8 to about 9, wt % of the metal salt is the zinc oxide (or any other metal phosphate, a metal sulfate, and/or a metal oxide described above) based on the total (meth)acrylic acid content of the copolymer. In other embodiments, about 2 to about 50 wt % of the metal salt is chosen from sodium, potassium, lithium, magnesium, barium, calcium, zinc, and zirconium salts, or combinations thereof. In one embodiment, the metal salt is chosen from Li, Na, K, Mg, CA, Ba, Ag, Hg, Cu, Fe, Co, Zn, Zr, AL, and Ce, salts. In various embodiments, this amount is from about 5 to about 45, about 10 to about 40, about 15 to about 35, about 20 to about 30, or about 20 to about 25,%. A balance of the weight can be any other combination of salts, e.g. any known in the art or described above. In various non-limiting embodiments, all values and ranges of values, both whole and fractional, both between and including each of the above, are hereby expressly contemplated for use herein.

The method also includes the step of grinding the neutralized copolymer to form the powder such that a temperature of grinding does not exceed a melting point or glass transition temperature of the neutralized copolymer. In various embodiments, the melting point and/or glass transition temperature is at least 20, 25, 30, 35, or 40° C. and up to about 150, 145, 140, 135, 130, 125, 120, 115, 110, 105, 100, 95, 90, 85, 80, 75, or 70, ° C., or any range thereof. In various embodiments, the melting point and/or glass transition temperature is from about 20 to about 150, about 20 to about 100, or about 20 to about 80, ° C. The melting point and/or glass transition temperature may be measured using any instrument and any method known in the art such as ASTM D6604-00. In one embodiment, step of grinding is further defined as cryogenically grinding, e.g. at temperatures known in the art, e.g. below 0, −25, −50, −75, −100, ° C., etc., or those associated with use of dry ice, liquid nitrogen, etc. In various non-limiting embodiments, all values and ranges of values, both whole and fractional, both between and including each of the above, are hereby expressly contemplated for use herein.

Additives:

The powder may optionally include, or be free of, one or more additives. These additives may include, but are not limited to, catalysts, fillers, fibers, pigments, flow agents, bubble-release agents, antioxidants, heat stabilizers, ultraviolet (UV) light absorbers, UV light blockers, flame-retardant agents, corrosion-resistant agents, gloss agents, electrically conductive agents, clarifying agents, blowing agents, compatibilizing agents, antistatic agent, ant-gasping agents and/or other additives known to those skilled in the art. These additives may be present in the composition in amounts and in forms well known in the art.

For example, the method may include the step of combining the neutralized copolymer and/or powder with an additive or an excipient chosen from stabilizers, pigments, flow control agents, lubricants, fillers, and combinations thereof. In various embodiments, the powder comprises about 1 to about 10, about 2 to about 9, about 3 to about 8, about 4 to about 7, or about 5 to about 6, wt % of the excipient based on a total weight of the powder.

Relative to pigments and fillers, the powder may include a single pigment or filler or a mixture of pigments and/or fillers. Suitable pigments include, but are not limited to, titanium dioxide; ultramarine blue; phthalocyanines, such as phthalocyanine blue and phthalocyanine green; anthraquinones; quinacridones; thioindigos; azo pigments carbon black; graphite fibrils; iron oxides, such as black iron oxide; chromium green oxide; ferried yellow; quindo red; or combinations thereof. Examples of special effect-imparting pigments are metal pigments, for example, made from aluminum, copper or other metals, interference pigments, such as metal oxide coated metal pigments and coated mica. These pigments can be added in conventional amounts known to those skilled in the art.

Suitable fillers include, but are not limited to, barium sulphate; silicas, such as precipitated silicas and clay; or combinations thereof. The powder may include titanium dioxide, barium sulphate or a combination thereof. Suitably, the powder may include titanium dioxide and barium sulphate. The pigment and/or filler, when present, may be used in the powder in any suitable amount. Each of the pigment and/or filler, when present, may independently be present in an amount of from about 10 to about 90, about 15 to about 85, about 20 to about 80, about 25 to about 75, about 30 to about 70, about 35 to about 65, about 40 to about 60, about 45 to about 55, or about 50 to about 55, wt % based on a total weight of the powder. In various non-limiting embodiments, all values and ranges of values, both whole and fractional, both between and including each of the above, are hereby expressly contemplated for use herein.

The powder can also include one or more waxes to provide additional properties such as slip by significantly reducing the surface coefficient of friction of the powder. Other properties include block resistance, rub and scratch resistance. Suitable waxes may be chosen from but not limited to polyethylene (PE) wax, microcrystalline PE wax, high molecular weight PE wax, polytetrafluoroethylene (PTFE) waxes, PTFE and combinations. These waxes and mixture thereof can be added in conventional amounts known to those skilled in the art.

The powder can also include one or more of the following UV stabilizers such as but not limited to Chimasorb 944 Poly[[6-[(1,1,3,3-tetramethylbutyl)amino]-1,3,5-triazine-2,4-diyl] [(2,2,6,6-tetramethyl-4-piperidinyl)imino]-1,6-hexanediyl[(2,2,6,6-tetramethyl-4-piperidinyl)imino]]), Hostavin N30 P Polymer of 2,2,4,4,-tetramethyl-7-oxa-3,20-diazadispiro-(5.1.11.2)heneicosan-21-one and epichlorohydrin hydroxydodecyloxy benzophenone, 2,4-dihydroxybenzophenone, hydroxybenzophenones containing sulfonic groups and the like: triazoles such as 2-phenyl-4-(2,2'-dihydroxylbenzoyl)-triazoles; substituted benzothiazoles such as hydroxyphenylthiazoles and the like; triazines such as 3,5-dialkyl-4-hydroxyphenyl derivatives of triazine, sulfur containing derivatives of dialkyl-4-hydroxy phenyl triazines, hydroxyphenyl-1,3,5-triazine and the like; benzoates such as dibenzoate of diphenylol propane, tertiary butyl benzoate of diphenylol propane and the like; and others such as lower alkyl thiomethylene containing phenols, substituted benzenes such as 1,3-bis-(2-hydroxybenzoyl)benzene, metal derivatives of 3,5-di-t-butyl-4-hydroxy phenyl propionic acid, asymmetrical oxalic acid, diarylarides, alkylhydroxy phenyl-thioalkanoic acid ester, and hindered amines of bipiperidyl derivatives, and combinations thereof.

Thermal stabilizers can be added to the powder and are responsible for preventing thermal degradation of polymers when exposed to elevated temperatures. They can include but are not limited to pentaerythritol tetrakis(3-(3,5-di-tert-butyl-4-hydroxyphenyl)propionate, 1,3,5-tris(3,5-di-tert-butyl-4-hydroxybenzyl)-1,3,5-triazine-2,4,6(1H,3H, 5H)-trione, thiodiethylene bis(3-(3,5-di-tert-butyl-4-hydroxyphenyl)propionate), bisphenolics such as Cyanox 2246 and 425, tris-nonyl-phenyl phosphate (TNPP), tris(2,4-di-tert-butylphenyl) phosphite, (Irgafos 168), and combinations thereof.

Nucleating agents can also be added to the polymer that can crystallize in order to speed cycle times, and for improving mechanical properties such as stiffness and flexural modulus. Examples of nucleating agents include but are not limited to Hyperform HPN-20E, Hyperform HPN-68L, Millard 3988, ADK Stabilizer NA-11, ADK Stabilizer NA-21.

This disclosure also provides a method of applying the powder to a surface or substrate, such as a metal surface or substrate. The step of applying may be any type known in the art. For example, the powder may be applied using any powder coating methods known in the art. The powder may be used to form a coating on the surface and/or substrate using any method known in the art. Alternatively, the powder may be used to bond one or more elements to the substrate or surface including, but not limited to, metal, glass, wood, brick, rock, concrete, silicone, plastic, or polymeric elements.

The surface or substrate may or may not be pre-treated. In order to achieve the optimum protective or decorative performance, all of the surfaces or substrates typically must be free of rust, grease, mill scale and any other contamination because these might inhibit the adhesion of the powder. This in turn can give rise to a premature failure of the powder. Several metal pre-treatment systems can be used prior to powder coating applications. More than one pre-treatment process may be necessary for some metal components. This typically depends on the design of the substrate or surface, the application for which it is intended and the coating performance specification that is required. Typically, mechanical pre-treatment, such as grit blasting, can follow degreasing using either solvents or aqueous solutions. In addition, the method may include chemical pre-treatment of steel such as pre-treatment of zinc plated or galvanized steel, pre-treatment of cast iron, pre-treatment of aluminum, or pre-treatment of stainless steel. Each of these may include any one or more steps or components known in the art.

The powder can be applied as a single layer or as multilayers, or can be applied on to a precoated surface for example but not limited to an epoxy coated surface, conventional thermoset layer, thermoplastic layer. In various embodiments, the powder is applied using electrostatic spray, fluidized bed coating, flock spray, flame spray, or the like.

The powder can provide long-term corrosion protection for metals used in applications such as fencing, street furniture, stadium seat frames, inner and outer pipe linings and dishwasher baskets. The powder can be produced in either matte, semi matte and high gloss and satin surface finishes by methods known in the art. The coatings formed from the powder can be designed to function without deterioration in marine and coastal areas, oil and gas applications, against some of the most demanding environments. The coatings formed from the powder can also be designed to exhibit superior resistance to salt, sea, sand and sun. The coatings formed from the powder can also exhibit excellent abrasion protection with high flexibility including applications in automotive parts and transportation markets, where the coating must be tough, flexible and stone chip resistant. Automotive applications include but not limited to accessories: bike racks, pipe fuel tanks, battery casings, door hangs, chassis, springs or all other parts exposed to stone impacts.

The coatings formed from the powder can also exhibit excellent self-adhesive properties and can be applied in a wide array of applications and processing techniques including electro-static spraying, flock spraying, flame spraying and fluid bed dipping or methods known in the art. The powder coatings disclosed herein can be applied to all metal surfaces and articles for example but not limited to steel, galvanized steel, ferrous alloy, aluminum, tin, lead or other metal surfaces.

Additional Embodiments

In various embodiments, the neutralized copolymers can be prepared via reacting monovalent and divalent metal cations directly in to the melt phase of an extruder. Neutralized copolymers can be formed without the need to use aqueous solutions or slurries of monovalent and divalent metal cations or utilizing specialized extruders for containing liquids under pressure or require advanced extraction of volatiles generated. Neutralized copolymers can be formed either via one pass or multiple passes depending on screw configuration, temperatures, speed, residence time and barrel length. Neutralized copolymers can be formed in situ without the need for any additional processing steps i.e. preparing the neutralized copolymer prior to powder preparation. Additives, pigments can be added to the in situ formed neutralized copolymer, leading to faster turnarounds, reduced downtime and cost saving. The method can include or be an inline process via a masterbatch or compound approach. Monovalent and divalent metal cations can be reacted with suitably functionalized resins in the melt phase without the use of liquids or slurries. Neutralized copolymers can be made via pre-blends of additives containing metal oxides or via a dosing approach, wherein the latter allows greater scale up capability and is not limited by bin sizes to mix pre-blends. Powder coatings prepared with neutralized copolymers can be sprayed directly on to the metal substrate, or can be applied over, for example, thermoplastic coatings, thermoset coatings, epoxy or suitable primer coatings. Moreover, powder Coatings prepared with neutralized copolymers can over sprayed directly with thermoplastic coatings, thermoset coatings, or combinations thereof.

In various embodiments, the complexity of the instant process is significantly reduced as compared to the art wherein the instant process can be executed "inline" or "in situ", without the need to form a neutralized copolymer (ionomer) prior to the final powder preparation. This can include additives known in the art along with pigments via an inline process. The neutralized copolymer (ionomer) preparation can be formed in the masterbatch stage or compounding stage. There is no dependency on commercial source of neutralized copolymer (ionomer) with the instant process. This will enable raw material cost savings due to the wide availability of commercial C3 to C8 $\alpha,\beta$ ethylenically unsaturated carboxylic acids along with the possibility to make in-house copolymers and terpolymers. As the process can utilize "inline or in situ" processes, this will allow reduced downtimes, between product runs and a less labor intensive process. The neutralized copolymer (ionomer) formation does not require modification of extruders or include additional extraction capacity and works well on single and double screw conventional extruders.

In other embodiments, the process for making a powder for bonding to a substrate includes combining a copolymer and mono- or di-valent metal ions to form a mixture, wherein the copolymer has from about 80 to about 98 wt % of an ethylene moiety and about 2 to about 20 wt % of a (meth)acrylate moiety; reactively extruding the mixture to form a neutralized copolymer having a melt flow index of from about 10 to about 35 g/10 min, wherein about 2 to about 20 wt % of the (meth)acrylate moiety is neutralized to form a mono- or di-valent metal salt comprising about 4 to about 12 wt % zinc oxide based on total (meth)acrylic acid content; and cryogenically grinding the neutralized copolymer to form the powder having a Dv10 particle size of from about 40 to about 80 μm, a Dv50 particle size of from about 100 to about 200 μm, and a Dv90 particle size of from about 150 to about 300 μm, each as determined using ASTM D5861, wherein the process is free of utilizing a liquid and/or a slurry. For example, the powder may have a Dv10 particle size of from about 60 to about 80 μm, a Dv50 particle size of from about 180 to about 200 μm, and a Dv90 particle size of from about 280 to about 300 μm, each as determined using ASTM D5861. Alternatively, the power may have a Dv10 particle size of from about 40 to about 50 μm, a Dv50 particle size of from about 115 to about 125 μm, and a Dv90 particle size of from about 160 to about 180 μm, each as determined using ASTM D5861. Moreover, the copolymer may be the reaction product of ethylene and methacrylate and/or acrylic acid and an optional comonomer. For example, the comonomer may be chosen from vinyl acetate, a C1-C11 alkylacrylate, a C3-C11 alkyl vinyl ether, and combinations thereof.

In various embodiments, this process does not require the need to keep a pressure relatively high. The monovalent or divalent actions can be added to a carboxyl functionalized resin preblended or dosed. This can then be added directly into a Zone 0 of an extruder wherein natural shear forces and normal pressure generated is sufficient to enable reaction between the metallic ions and the carboxyl functionality. Addition improvements can be made by using dedicated screw configurations, temperature, residence time and barrel length and any other method known in the art.

EXAMPLES

All of the following Examples are generated using a standard APV lab extruder, twin screw of 19 mm nominal size, 25 L/D with a customised general purpose screw. It was flood fed by a detached volumetric screw feeder. The barrel has 4 zones with a single vent port~⅛ from the die end. The maximum working temperature in region of 270° C. Scaleup was performed on a production extruder. For example, a Leistritz 1 Production extruder with a twin Screw of 40 mm nominal size, 36 L/D with a customised screw is used. It is flood fed by a detached volumetric screw feeder. The barrel 8 Zones and has 2 vent ports~½ way and ~⅛ way from the die end. Throughput is 100-200 kg/hr, the maximum working temperature is about 400° C. Moreover, a Leistritz 2 Production extruder with a Twin Screw of 50 mm nominal size, 36 L/D with a customised screw is also used. It is flood fed by 3 linked gravimetric screw feeders. 1 Feeder is a side feed~⅛ way from the die. The barrel 8 Zones and has 2 vent ports~½ way and ⅛ way from the die end. Throughput is 200-400 kg/hr, the maximum working temperature is about 400° C.

Example 1

The following runs are generated wherein each formulation is a preblend, the APV extruder temperature is about 220° C., the RPM is about 300, and the copolymer EAA is ethylene acrylic acid (EAA) copolymer.

| Run | Copolymer | Wt. % ZnO* | MFI (g/10 min) | Shore D | Pull Off Test ASTM 4541 (MPa) |
|---|---|---|---|---|---|
| 1 | EAA | 8 | 18 | 46 | >5 MPa |
| 2 | EAA | 12 | 15 | 47 | >5 MPa |
| 3 | EAA | 16 | 12 | 48 | >5 MPa |
| 4 | EAA | 20 | 8 | 49 | >5 MPa |

*Wt. % of ZnO is based on the acrylic acid content of the EAA copolymer

| Run | Copolymer | Wt. % Mono and divalent cation* | MFI (g/10 min) | Shore D | Pull Off Test ASTM 4541 (MPa) |
|---|---|---|---|---|---|
| 5 | EAA | 8 (NaOAc) | 21.8 | 49 | >5 MPa |
| 6 | EAA | 8 (Zn(CO$_2$CHCH$_2$)$_2$) | 21.2 | 49 | >5 MPa |

*Wt. % of Mono or Divalent cation is based on the acrylic acid content.

In these runs, EAA was preblended with heat stabilizers and ZnO or mono and divalent cation and mixed as per standard procedure; as a dry blend mix and added at 2-12 kg/hr. through the extruder. The weight % of ZnO or mono and divalent cation is based on the total acid functionality available for neutralization and neutralized copolymer formation. The starting melt flow index of the EAA was 30 g/10 min and shore D was 42 prior to reactive extrusion. The results clearly indicate that the addition of the metal cation used as "dry on dry" approach is suitable to form a neutralized copolymer. The neutralized copolymer formed produced MFI's values ranging from 8-18 g/10 min depending on ZnO or mono and divalent cation concentration.

Each of the Runs 1-6 were converted into a powder. Compounded final pellets were cryogenically ground and filtered with the appropriate mesh/sieve to give the final powders. The particles size (Dv50) of the powders were of from about 10 to about 600 μm depending on final application method, as determined using the methods described above. The final powder was coated on to the metallic surface to form a protective coating layer. The coating demonstrated good adhesive properties to the substrate with a pull off strength of >5 MPa.

Example 2: Preblending and Dosing Runs

Pre-blend vs dosing runs were completed and indicated that both approaches were viable for the manufactures of neutralized copolymers based on "dry on dry" approach. Compositions were based on an EAA copolymer, heat stabilizer, flow additives and ZnO. The starting melt flow index of the EAA was 30 g/10 min and shore D was 42 prior to reactive extrusion. The Compositions 1-12 were based on 0.5 weight % of ZnO based acrylic acid content.

| Composition | Formulation | Throughput (kg/h) | Screw Speed (rpm) | Die Pressure (bar) | Probe Temp (° C.) | MFI (g/10 min) | Shore D |
|---|---|---|---|---|---|---|---|
| 1 | dry blend | 1 | 400 | 20 | 177 | 17 | 47 |
| 2 | dry blend | 2 | 500 | 27 | 178 | 19.5 | 47 |
| 3 | dry blend | 1 | 400 | 20 | 179 | 18 | 47 |
| 4 | dry blend | 2 | 500 | 28 | 177 | 19 | 48 |
| 5 | 2 doses in extruder | 1 | 400 | 20 | 177 | 18 | 47 |
| 6 | 2 doses in extruder | 2 | 500 | 27 | 176 | 19 | 47 |
| 7 | 2 doses in extruder | 3 | 600 | 32 | 178 | 21 | 47 |
| 8 | 2 doses in extruder | 1 | 400 | 21 | 176 | 18.5 | 47 |
| 9 | dry blend | 3 | 600 | 32 | 180 | 19 | 46 |
| 10 | dry blend | 3 | 600 | 33 | 179 | 18 | 48 |
| 11 | 2 doses in extruder | 2 | 500 | 27 | 177 | 20 | 47 |
| 12 | 2 doses in extruder | 3 | 600 | 32 | 178 | 20 | 48 |

Examples 3 and 4

The aforementioned process was repeated "inline" as a "dry on dry" process without the need to start with a process of preparing neutralized copolymers. In addition, as shown in example 3 below, the neutralized copolymer is formed in situ in the presence of other additives, flow additives, UV stabilizer, heat stabilizer and those known in the art. A standard additive masterbatch can be prepared, comprising heat stabilizers such as Irganox additives and Irgafos additives, UV stabilizers such as Chimassorb, Hostavins, flow additives from BYK and Synthron and EAA copolymer. The ZnO can be added to an additive masterbatch or to the final compound as shown in example 3. Alternatively, as in Example 4 below, the EAA neutralized copolymer can be prepared by the "dry on dry process prior to the preparation of the powder coating as pre-supplied neutralized copolymer.

|  | Example 3 | Example 4 |
| --- | --- | --- |
| Composition | 1. EAA Copolymer 85-95%<br>2. Masterbatch 2-10%<br>3. Carbon Black Masterbatch. 2-6% | 1. EAA neutralized copolymer 85-95%<br>2. Masterbatch 2-10%<br>3. Carbon Black Masterbatch. 2-6% |
| Wt. % ZnO | 0.5 | 0.5 |

Comparative Examples 1 and 2 are based on commercial powder coating products, only Comparative Example 2 is based on a commercially available neutralized copolymer. Comparative Example 1 is a carboxyl functionalized resin (non ionomer). Comparative example 2 is a Zinc ionomer based on ethylene methacrylic acid copolymer.

|  | Comparative Example 1 | Comparative Example 2 | Example 3 | Example 4 |
| --- | --- | --- | --- | --- |
| Wt. % ZnO | — | Commercial Neutralized Copolymer | 0.5 | 0.5 |
| Melt Flow Index g per 10 mins ASTM D1238 | 35-30 | 20-30 | 20 | 24 |
| Stress Crack Resistance ASTM D1693 | Pass | Pass | Pass | Pass |
| Hardness/Shore D | 43 | 55 | 48 | 48 |
| Tensile Strength at Yield/MPA ISO 527 | 8 | 8.97 | 6.5 | 6.11 |
| Tensile Strength/MPA ISO 527 | 14 | 20.12 | 15.8 | 14.92 |
| Elongation/% ISO 527 | 650 | 425 | 510 | 503 |
| Abrasion Resistance H18 Wheel 500 g load 1000 cycles | 60 | 67.3 | 49 | 51.1 |
| Abrasion Resistance C17 Wheel 500 g load 1000 cycles | 25 | 12.8 | 12.5 | 12.3 |
| Surface finish | Smooth | Smooth | Smooth | Smooth |
| Gloss ISO 2813 at 60° C. | ~80 | ~80 |  | ~80 |
| Adhesion (Pull off test) | A1 | A1 | A1 | A1 |
| Salt Spray-Loss of Adhesion From Scribe-1500 Hours ISO 7253 | 6-9 mm | 9-15 mm | 4-5 mm (After 500 hours) | 4-6 mm (After 500 hours) |
| QUV ASTM G53-77 2000 hours | No Blistering, Cracking, Or Significant Loss Of Gloss | No Blistering, Cracking, Or Significant Loss Of Gloss | No Blistering, Cracking, Or Significant Loss Of Gloss | No Blistering, Cracking, Or Significant Loss Of Gloss |

Examples 3 and 4 show comparable performance to Comparative Example 2 based on commercially neutralized copolymer resins. Marginal improvements in salt spray, elongation at break and Taber abrasion confirm that metal cations can be used directly as a "dry on dry" process and more importantly "in situ" or "inline" leading to the efficient formation of neutralized copolymers. This process can be applied to the preparation of neutralized copolymers for powder coating applications efficiently and cost effectively, with good mechanical and physical properties for powder coating applications for example, but not limited to, fencing, street furniture, to automotive parts, stadium seat frames, glass wear, protective glass, glass bottles, pipe linings, outer pipe coatings and dishwasher baskets and appliance applications.

Throughout this disclosure, the following physical properties may be determined using any method known in the art, such as those set forth below:

Melt Flow Index: a Dynesco LMI-4000 MFI Tester can be used to determine the Melt Flow Index (MFI) using ASTM D1238-10 and ISO1133.

Tensile properties: a T1000 Tensile Tester can be used to measure Tensile strength and Elongation at Break according to ISO 527.

Hardness: Shore D can be measured according to ASTM D2240.

Gloss: a 60° Gloss parameter can be measured according ISO2813.

Abrasion: Taber Abrasion can be used to measure abrasion properties according to ASTM4060/84.

Salt Spray: This parameter can be measured according to ISO9227 and NF 41-002

Adhesion (Pull off test): Adhesion is measured when the powder is coated onto a metal substrate. Adhesion is checked once the coated sample is cooled to room temperature. The coated sample is held horizontally in a vice. Two lines were cut through the coating to the metal substrate parallel to each other approximately 10-30 mm apart. Another cut of approximately 20°-50° to the parallel lines is then made. An attempt is made to lift the coating at the apex of the cross cut using a knife. The adhesive bond strength is assessed by pulling the flap with a pair of pliers and grading the result as follows; (A1) The adhesive bond to the substrate is stronger than the tensile strength of the coating and the coating could not be peeled off; (A2) The coating Could be peeled off but pieces of the coating were left adhering to the substrate; (A3) The coating could be peeled off without damaging the coating but still showing signs of adhesion (Sellotape level of adhesion); (A4) The coating shows no signs of adhesion at all. Additionally adhesion is measure by a dolly pull off test according to ASTM D4541.

Weathering: a QUV weathering test can be performed according to ASTM G53-77.

Differential Scanning calorimetry (DSC): This parameter can be measured on Netzsch DSC 200 F3.

Environmental Stress Crack Resistance Testing (ESCR): ESCR can be performed in accordance with ASTM D1693.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A process for making a powder for bonding to a substrate, the method comprising the steps of:
    combining a copolymer and mono- or di-valent metal ions to form a mixture, wherein the copolymer has from about 70 to about 98 wt % of an alpha-olefin moiety and about 2 to about 30 wt % of a (meth)acrylate moiety, each based on a total weight of the copolymer;
    reactively extruding the mixture to react the metal ions with the copolymer in the melt phase of the extrusion process to form in situ a neutralized copolymer having a melt flow index of from about 5 to about 1500 g/10 min, wherein the mixture is a dry mixture during extrusion, wherein during extrusion about 2 to about 50 wt % of the (meth)acrylate moiety is neutralized to form a mono- or di-valent metal salt present in an amount of from about 0.2 to about 20% based on the total (meth)acrylic acid content of the copolymer; and
    grinding the neutralized copolymer to form the powder such that a temperature of grinding does not exceed a melting point of the neutralized copolymer,
    wherein the process is free of utilizing a liquid.

2. The process of claim 1 wherein the mono- or di-valent metal salt comprises a metal phosphate, sulfate, and/or oxide each independently chosen from sodium, potassium, lithium, magnesium, barium, calcium, zinc, and zirconium phosphates, sulfates, and/or oxides, and combinations thereof.

3. The process of claim 2 wherein the mono- or di-valent metal salt comprises zinc oxide.

4. The process of claim 3 wherein about 4 to about 12 wt % of the metal salt is the zinc oxide based on the total (meth)acrylic acid content of the copolymer.

5. The process of claim 1 wherein the copolymer has from about 80 to about 90 wt % of the alpha-olefin moiety and about 2 to about 20 wt % of the (meth)acrylate moiety.

6. The process of claim 1 wherein about 2 to about 20% of the (meth)acrylate moiety is neutralized to form the mono- or di-valent metal salt.

7. The process of claim 1 wherein the powder has a Dv50 particle size of from about 10 to about 600 μm, —as determined using ASTM D5861.

8. The process of claim 1 wherein the melt flow index is from about 10 to about 35 g/10 min.

9. The process of claim 1 wherein the step of grinding is further defined as cryogenically grinding.

10. The process of claim 1 further comprising the step of combining the neutralized copolymer and/or powder with an excipient chosen from stabilizers, pigments, flow control agents, lubricants, fillers, and combinations thereof.

11. The process of claim 10 wherein the powder comprises about 1 to about 10 wt % of the excipient based on a total weight of the powder.

12. The process of claim 1 wherein the copolymer is the reaction product of an alpha-olefin, a (meth)acrylate, and an additional co-monomer, such that a co-monomer moiety is present in the copolymer in an amount of up to about 25 wt % based on a total weight of the copolymer.

13. The process of claim 12 wherein the alpha-olefin is ethylene, the (meth)acrylate is methacrylate and/or acrylic acid, and the comonomer is chosen from vinyl acetate, a C1-C11 alkylacrylate, a C3-C11 alkyl vinyl ether, and combinations thereof.

14. The process of claim 12 wherein the comonomer is chosen from vinyl acetate, a C1-C11 alkylacrylate, a C3-C11 alkyl vinyl ether, and combinations thereof.

15. The process of claim 1 wherein the alpha-olefin moiety is an ethylene moiety and the (meth)acrylate moiety is a methacrylate and/or acrylic acid moiety.

16. A process for making a powder for bonding to a substrate, the method comprising the steps of:
    combining a copolymer and mono- or di-valent metal ions to form a mixture, wherein the copolymer has from about 80 to about 98 wt % of an ethylene moiety and about 2 to about 20 wt % of a (meth)acrylate moiety;
    reactively extruding the mixture to react the metal ions with the copolymer in the melt phase of the extrusion process to form in situ a neutralized copolymer having a melt flow index of from about 10 to about 35 g/10 min, wherein the mixture is a dry mixture during extrusion, wherein during extrusion about 2 to about 20 wt % of the (meth)acrylate moiety is neutralized to form a mono- or di-valent metal salt comprising about 4 to about 12 wt % zinc oxide based on total (meth) acrylic acid content; and
    cryogenically grinding the neutralized copolymer to form the powder,
    wherein the neutralized copolymer is not formed prior to the step of reactively extruding the mixture;
    wherein the process is free of utilizing a liquid.

17. The process of claim 16 wherein the powder has a Dv10 particle size of from about 40 to about 80 m, a Dv50 particle size of from about 100 to about 200 μm, and a Dv90 particle size of from about 150 to about 300 μm, each as determined using ASTM D5861.

18. The process of claim 16 wherein the powder has a Dv10 particle size of from about 40 to about 50 μm, a Dv50 particle size of from about 115 to about 125 μm, and a Dv90 particle size of from about 160 to about 180 μm, each as determined using ASTM D5861.

19. The process of claim 16 wherein the copolymer is the reaction product of ethylene and methacrylate and/or acrylic acid and an optional comonomer.

20. The process of claim 19 wherein the comonomer is utilized and is chosen from vinyl acetate, a C1-C11 alkylacrylate, a C3-C11 alkyl vinyl ether, and combinations thereof.

* * * * *